United States Patent [19]
Haller

[11] 3,995,967
[45] Dec. 7, 1976

[54] SIMULTANEOUSLY EXPANDING AND CONTRACTING ANNULAR COUPLING DEVICE

[75] Inventor: John Haller, Triesen, Liechtenstein

[73] Assignee: Michigan Powdered Metal Products, Inc., Livonia, Mich.

[22] Filed: Aug. 13, 1975

[21] Appl. No.: 604,479

[52] U.S. Cl. .............................. 403/370; 403/372; 279/2 R
[51] Int. Cl.² .......................................... F16D 1/06
[58] Field of Search .......... 403/372, 365, 370, 368; 279/2, 1 W

[56] References Cited
UNITED STATES PATENTS

| | | | |
|---|---|---|---|
| 2,989,327 | 6/1961 | Hermanus | 403/372 |
| 3,112,116 | 11/1963 | Seitz | 403/370 X |
| 3,168,338 | 2/1965 | Spieth | 403/365 |
| 3,433,514 | 3/1969 | Feighofen | 403/370 |
| 3,578,364 | 5/1971 | Ehrenberg | 403/370 |
| 3,679,245 | 7/1972 | Ehrenberg | 403/372 |

FOREIGN PATENTS OR APPLICATIONS

| | | | |
|---|---|---|---|
| 869,892 | 3/1953 | Germany | 403/372 |

*Primary Examiner*—Andrew V. Kundrat
*Attorney, Agent, or Firm*—Willis Bugbee

[57] ABSTRACT

For drivingly connecting the external cylindrical surface of an inner machine element to the internal cylindrical surface of an outer machine element, such as a shaft to a pulley, forward and rearward clamping rings are spaced axially apart from one another and have circumferentially spaced aligned bolt holes disposed parallel to the axis of their internal and external cylindrical surfaces. One ring has smooth bolt holes and the other ring has threaded bolt holes, these holes receiving threaded clamping bolts. Mounted in the space between the two clamping rings are pairs of alternately oppositely facing resilient coupling rings of substantially Z-shaped cross-section having bolt holes aligned with the clamping ring bolt holes. Each coupling ring consists of radially-spaced inner and outer annular rims connected at acute angles to the opposite ends of an annular web inclined at an oblique angle to the axis of the cylindrical outer and inner surfaces of these coupling rings. Tightening the clamping bolts urges the clamping rings toward one another, thereby compressing the coupling rings so that their obliquely inclined webs are deformed into more nearly radial positions to the axis of the clamping rings, consequently forcing the inner and outer annular rims to simultaneously expand and contract in opposite directions into frictional coupling engagement with the external and internal surfaces respectively of the inner and outer machine elements.

9 Claims, 5 Drawing Figures

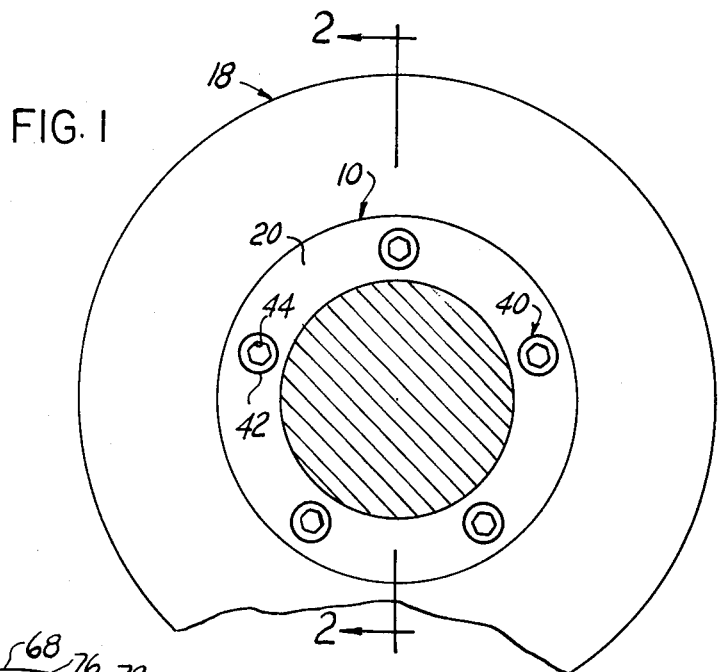
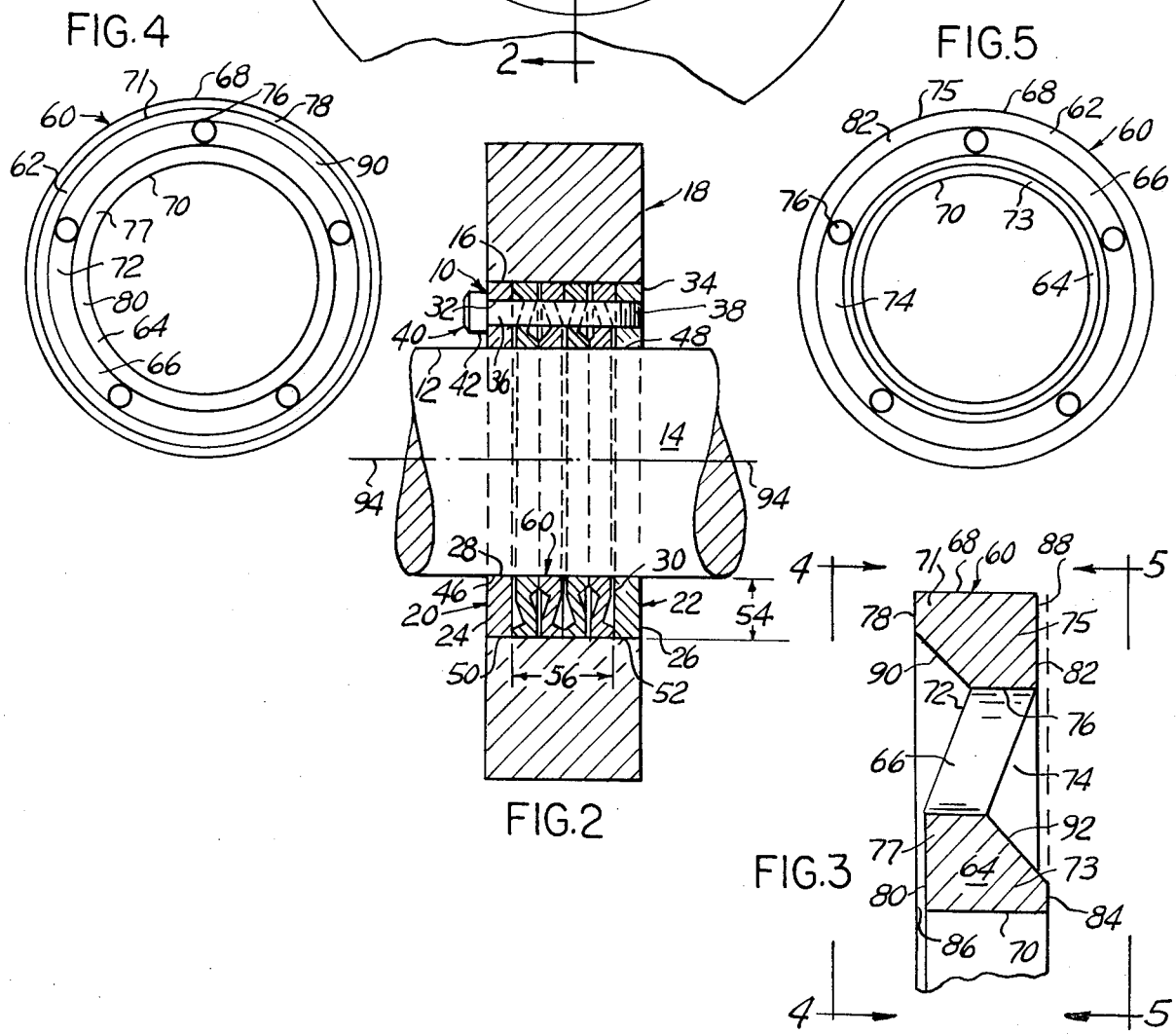

SIMULTANEOUSLY EXPANDING AND CONTRACTING ANNULAR COUPLING DEVICE

SUMMARY OF THE INVENTION

The alternately oppositely facing coupling rings of substantially Z-shaped cross-section, when compressed axially, expand radially both outwardly and inwardly because of the deformation, toward more nearly radial positions, of the obliquely-inclined web portions to the opposite ends of which the pairs of oppositely-facing coupling rings are connected at acute angles. The opposite faces of the opposing rings in cross-section resemble shoe toes and heels and, being independent of one another in adjacent coupling rings, are free to slide radially relatively to one another and also to slide relatively to the inner faces of the clamping rings which the outermost coupling rings engage as the clamping bolts are tightened. The various rings are preferably of sintered powdered nickel steel alloy for maximum strength and greater ease of manufacture.

In the drawings,

FIG. 1 is a left-hand elevation of a simultaneously expanding and contracting annular coupling device, according to one form of the invention, as shown for purposes of illustration in drivingly interconnecting a shaft and a pulley;

FIG. 2 is a central vertical section, taken along the line 2—2 in FIG. 1;

FIG. 3 is an enlarged radial section through a portion of one of the coupling rings of the coupling device shown in FIG. 2;

FIG. 4 is a front elevation of one of the coupling rings of the double-acting coupling device shown in FIG. 2; and FIG. 5 is a rear elevation of the same coupling ring shown in FIG. 4.

Referring to the drawings in detail, FIGS. 1 and 2 show a simultaneously expanding and contracting annular coupling device, generally designated 10, as mounted, for purposes of example but not limitation, between the external cylindrical surface 12 of a shaft 14 and the internal cylindrical surface 16 of a machine element 18 shown diagrammatically as a pulley but also capable of being a gear, a cam, a vehicle wheel or other similar or analogous machine element. The annular coupling device 10 consists generally of two axially-spaced clamping rings 20 and 22 respectively and flat inner surfaces 28 and 30 respectively. The clamping rings 20 and 22 are provided with circumferentially-spaced bolt holes 32 and 34 respectively. The bolt holes 32 being smooth-bored and the bolt holes 34 are threaded to receive the smooth shanks 36 and threaded ends 38 of clamping bolts or screws 40 having heads 42 and preferably countersunk hexagonal wrench sockets 44 for the reception of so-called Allen wrenches.

The clamping rings 20 and 22 have internal cylindrical surfaces 46 and 48 respectively, and also have external cylindrical surfaces 50 and 52 adapted to loosely fit the annular space 54 between the external surface 12 of the shaft 14 and the internal surface 16 of the machine element 18. Mounted in the annular space 56 between the clamping rings 20 and 22 are pairs of oppositely-facing resilient coupling rings, generally designated 60 (FIGS. 3, 4 and 5). Each coupling ring 60 is of annular form and of substantially Z-shaped cross-section with an outer rim 62 and an inner rim 64. The outer and inner rims 62 and 64 are connected at acute angles to the opposite ends of by an intermediate frusto-conical web portion 66 inclined obliquely to the coaxial external and internal cylindrical surfaces 68 and 70 of the coupling rings 60, and have opposite obliquely inclined surfaces 72 and 74 respectively. Each coupling ring 60 in its web portion 66 has circumferentially-spaced bolt holes 76 aligned with the bolt holes 32 and 34 in the clamping rings 20 and 22 and of a size adapted to loosely accommodate the shanks 36 of the clamping bolts 40.

The outer rim 62 and inner rim 64, by their approximate resemblance, in cross-section, to a human foot, have oppositely-facing toe portions 71 and 73 respectively, and oppositely-facing heel portions 75 and 77 respectively. The forward face 78 of the toe portion 71 of the outer rim 62 projects axially beyond the forward face 80 of the heel portion 77 of the inner rim 64, whereas the rearward face 82 of the heel portion 75 of the outer rim 62 is also displaced forwardly in an axial direction relatively to the rearward face 84 of the heel portion 77 of the inner rim 64 thereby establishing inner and outer clearance spaces 86 and 88 respectively, which, as will be seen below in the description of the operation of the device 10, tend to close up as the coupling rings 60 are compressed between the forward and rearward clamping rings 20 and 22. An opposite oblique or frusto-conical surface 90 extends between the face 78 and the oblique surface 72, whereas a similar opposite oblique or frusto-conical surface 92 extends between the face 84 and the oblique surface 74. Thus, it will be seen from FIG. 2 that when the expansion rings 60 are assembled oppositely facing one another in pairs, the inner and outer clearances 86 and 88 alternate with one another from the forward clamping ring 20 to the rearward clamping ring 22.

An important advantage of the present invention is that the clamping rings 20 and 22 and the expansion rings 60, together with their holes 32, 34 and 76 are easily, inexpensively and rapidly manufactured from sintered powdered metal in accordance with conventional procedures, even though the expansion rings 60 are of complex cross-sectional configuration. Such manufacture by powder metallurgy procedures enables these component parts to be formed as compacts by briquetting dies in conventional briquetting processes and thereafter sintered. The smooth-walled holes 34 are then threaded to receive the five 10-32 clamping screws 40. This eliminates the complex machining operations and waste of materials which would otherwise be involved if the component parts were formed by machining operations from solid metal blanks. The component parts, and particularly the coupling rings 60, under actual manufacturing conditions, were found to possess the necessary resilience when they were compacted from an iron alloy powder containing 2% nickel and 0.9% graphite. The clamping rings 20 and 22 and the coupling rings 60 were compacted to a density of 6.7 to 6.8 grams per cubic centimeter and were then sintered in a conventional sintering furnace with a protective atmosphere at temperatures between 1900° and 2040° F. With the workpieces travelling through the furnace at a speed of three feet per minute. The sintered pieces, namely the clamping rings 20 and 22 and the coupling rings 60 were then drilled to receive five No. 10-32 screws and then heat-treated in a so-called Lucifer furnace at a temperature of 1600° F., to a carbon potential of 0.8 to 0.9 percent, followed by quenching in warm oil and tempering for one hour at 600° F. These components were then made up into assemblies for grinding to the specified internal and external dimensions or diameters and assembled as shown in FIGS. 1 and 2. The annular coupling device 10 was then slid onto the external surface 12 of the shaft 14 and into the internal surface or bore 16 of the surrounding machine element 18. These assemblies were tested for break-away load by progressively tightening the screws 40 to higher torque values up to a maximum of 120 inch-pounds, as specified for No. 10-32 screws. After each tightening increment, an increasing load was applied axially to the shaft 14 until the shaft moved, whereupon this load was recorded.

A holding power test of the annular coupling device 10 was then performed to test the holding power of the device 10 when various torques were applied to the shaft 14 while the machine element 18 was held stationary. The device 10 was tightened by tightening the screws 40 to a torque of 120 inch-pounds, whereupon the shaft 14 was twisted with a large torque wrench until slippage of the shaft 14 in the machine element 18 occured. The axial slippage and torque holding test results were recorded and are shown in the tables I annd II below.

TABLE I

ANNULAR COUPLING DEVICE DATA

| | |
|---|---|
| Inside diameter, inches | 1.5758 |
| Outside diameter, inches | 2.3614 |
| Axial length, inches | 1.063 |
| Axial break-away load, pounds | 9910 |
| Torque load, foot-pounds | 375 to 430 |
| Bolt torque, inch-pounds | 120 |
| Test block size, inches | 2.3627/3.3636 |
| Inside diameter clearance of shaft, inches | 0.0021 |
| Outside diameter clearance of coupling device, inches | 0.0015 |
| Maximum runout of shaft | 0.004 T.I.R. |

TABLE II

BREAK-AWAY LOAD VS. BOLT TORQUE

| Bolt Torque, Inch-Pounds | Break-Away Load, Pounds |
|---|---|
| 60 | 4750 |
| 80 | 6100 |
| 100 | 8200 |
| 120 | 9900 |

The above described series of axial slippage and torque slippage tests show that the annular coupling device 10 of the present invention has superior holding power in both axial and torque directions to prior annular connecting devices of similar sizes.

In the operation of the invention, the coupling rings 60 are assembled in pairs oppositely facing one another on the shanks 36 of the clamping bolts 40 with the latter loosely engaging the clamping rings 20 and 22. In this condition the device 10 is slid upon the shaft 14 and the machine element 18 is slid over the device 10. The clamping bolts 40 are then tightened with the aid of a suitable wrench, such as a so-called Allen wrench, whereupon the outer and inner rims 62 and 64 are pulled axially into their respective clearance spaces 86 and 88, thereby causing the web portions 66 of the expansion rings 60 to become deformed toward more nearly radial positions but still disposed at oblique angles to the axis 94 of the shaft 14. This action causes the outer and inner rims 62 and 64 of the expansion rings 60 and their cylindrical outer and inner surfaces 68 and 70 to be pushed outward and inward respectively by the deformation of the frusto-conical intermediate web 66 into tight clamping engagement with the internal surface 16 of the machine element 18 and with the external cylindrical surface 12 of the shaft 14, thereby drivingly interconnecting them, both against relative rotation and axial sliding. Loosening the clamping bolt 40 drivingly disengages the machine element 18 from the shaft 14 so that the former may be removed from the later, or vice versa.

I claim:

1. A simultaneously expanding and contracting annular coupling device for drivingly connecting the circular-cross-section external surface of an inner machine element with the circular-cross-section coaxial internal surface of an outer machine element spaced annularly outward from the external surface of the inner machine element, said coupling comprising a forward annular clamping member, a rearward annular clamping member disposed in coaxial spaced relationship with said forward annular clamping member, a plurality of annular coupling members of resiliently deformable material disposed in the annular space between said clamping members in coaxial engagement with said clamping members and with one another, said clamping members and said coupling members being constructed and arranged to enter and to loosely fit the annular space between the external surface of the inner machine element and the internal surface of the outer machine element, each of said coupling members being of substantially Z-shaped cross-section with an annular inner rim and an annular outer rim spaced outward from said inner rim and with an annular web interconnecting said rims and extending therebetween obliquely to the axis of said coupling member, said rims extending generally parallel to the axis of said coupling member and in opposite directions from said web and at acute angles thereto, and means for compressing said coupling members axially between said clamping members with consequent deformation of said oblique webs toward more nearly radial positions, and thereby simultaneously moving said inner and outer rims radially in opposite directions into frictional coupling engagement with said inner and outer machine elements.

2. An annular coupling device, according to claim 1, wherein the outer rim of each of said coupling members has an annular toe ridge projecting axially from one face thereof, and wherein the inner rim thereof has an annular toe ridge projecting axially from the opposite face thereof.

3. An annular coupling device, according to claim 2, wherein each rim of said coupling members has an annular heel ridge disposed on the face thereof opposite its respective toe ridge.

4. An annular coupling device, according to claim 3, wherein each of said toe ridges projects axially beyond the heel ridge on the same face of said coupling member.

5. An annular coupling device, according to claim 4, wherein said coupling members are disposed in pairs whereof the toe ridges of each pair are disposed in abutting relationship with one another.

6. An annular coupling device, according to claim 5, wherein the heel ridges of each coupling member are disposed in spaced relationship with one another.

7. An annular coupling device, according to claim 1, wherein said coupling members are disposed in pairs whereof the coupling members of each pair are disposed with their webs inclined obliquely in opposite directions relatively to one another.

8. An annular coupling device, according to claim 1, wherein said outer and inner rims of said clamping members have annular cylindrical outer and inner surfaces respectively.

9. An annular coupling device, according to claim 1, wherein said web of each of said coupling members is of frusto-conical configuration.

* * * * *